United States Patent [19]

Buchner

[11] 3,801,746

[45] Apr. 2, 1974

[54] TELECOMMUNICATION SYSTEM WITH MULTI-FREQUENCY SIGNALLING COMBINATIONS GENERATED FROM A PLURALITY OF SIGNAL SAMPLES STORED FOR EACH COMBINATION

[75] Inventor: Robert Bertold Buchner, Hilversum, Netherlands

[73] Assignee: U.S. Philips Corporation, New York, N.Y.

[22] Filed: July 13, 1972

[21] Appl. No.: 271,347

[30] Foreign Application Priority Data

July 29, 1971 Netherlands .................... 7110444

[52] U.S. Cl. .................... 179/15 BY, 179/15 AT

[51] Int. Cl. .................... H04j 3/12

[58] Field of Search ...... 179/15 AT, 15 BY, 15 AQ, 179/15 AC, 15.55 T

[56] References Cited

UNITED STATES PATENTS

| | | | |
|---|---|---|---|
| 3,558,823 | 1/1971 | Brilliant | 179/15 AC |
| 3,585,306 | 6/1971 | Battocletti | 179/15 AQ |
| 3,403,383 | 9/1968 | Kienzle | 179/15 AT |
| 3,629,846 | 12/1971 | Thompson | 179/15 AQ |

*Primary Examiner*—Kathleen H. Claffy
*Assistant Examiner*—David L. Stewart
*Attorney, Agent, or Firm*—Frank R. Trifari

[57] ABSTRACT

A telecommunication system with time division multiplex in which a group of receive highways terminates in a common data store. The local multiplex cycle of the telecommunication system internally provides a number of time channels which is larger than the number of time channels of the group of receive highways together. For MFC signalling a cyclic store is provided in which a group of signal samples is stored for each MFC combination. The signal samples are transferred to a group of storage locations of the data store which are individually associated with the MFC combinations. For the transmission of an MFC combination in a time channel of a send highway, the PCM words are cyclically transferred from the relevant storage location to the output of the data store in a time channel of the local multiplex cycle, and a communication path is established between this time channel and the channel of the send highway.

1 Claim, 1 Drawing Figure

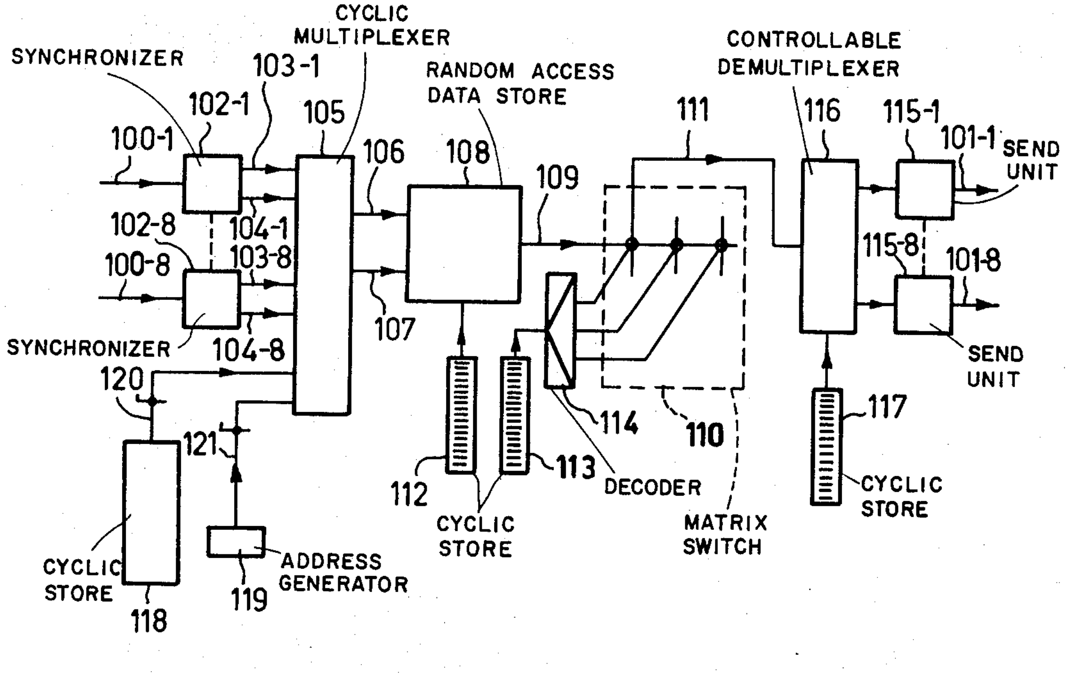
SYNCHRONIZER
CYCLIC MULTIPLEXER
RANDOM ACCESS DATA STORE
CONTROLLABLE DEMULTIPLEXER
SEND UNIT
SYNCHRONIZER
SEND UNIT
CYCLIC STORE
DECODER
MATRIX SWITCH
CYCLIC STORE
CYCLIC STORE
ADDRESS GENERATOR
100-1
100-8
102-1
102-8
103-1
103-8
104-1
104-8
105
106
107
108
109
110
111
112
113
114
115-1
115-8
116
117
118
119
120
121
101-1
101-8

TELECOMMUNICATION SYSTEM WITH MULTI-FREQUENCY SIGNALLING COMBINATIONS GENERATED FROM A PLURALITY OF SIGNAL SAMPLES STORED FOR EACH COMBINATION

The invention relates to a telecommunication system with time division multiplex whereto are connected PCM time multiplex transmission systems. Each of these systems comprises a receive highway and a send highway. These highways have a multiplex cycle which comprises a group of time channels. The system is provided with a data store which is associated with a group of receive highways. The system also uses a multiplex transfer unit for the transfer, in time channels of a local multiplex cycle, of the received PCM words from the group of receive highways to the data store in which these PCM words are stored in storage locations which are associated with the time channels of the group of receive highways in a one-to-one relationship. The local multiplex cycle comprises a number of time channels which is larger than the number of time channels of the group of receive highways together. A cyclic store is provided for controlling the cyclic transfer of the PCM words from a selected storage location of the data store to the output of the data store in a selected time channel of the local multiplex cycle. A selective time multiplex switching network is provided for the selective association of the time channels of the output of the data store with the channels of the send highways and for establishing communication paths between associated channels.

It is to be noted in advance that a selective time multiplex switching network is to be understood to mean a network comprising inputs and outputs which are divided in time and space and in which commutation which are divided in time and space or only in time can be established between selectively associated inputs and outputs. In the present case this definition covers the part of the telecommunication system between the output of the data store and the send highways, it being possible for said part to have an arbitrary construction.

If digital telephone exchanges of the kind set forth are introduced into a telephone network comprising conventional exchanges, the digital exchanges must be adapted to the conventional signalling methods. One of these signalling methods is the MFC signalling (multi frequency code) which is effected in the speech band. Accordingly, the invention has for its object to provide a telecommunication system of the kind set forth which incorporates facilities for transmitting MFC signals.

BRIEF SUMMARY OF THE INVENTION

The telecommunication system according to the invention is characterized in that for the transmission of multi-frequency combinations in the channels of the send highways a cyclic store is provided in which for each frequency combination in a group of signal samples is stored in the form of PCM words in storage locations which are accessible at intervals of a multiplex cycle. One signal sample of each other frequency combination is stored between each two successive signal samples of one frequency combination. The multiplex transfer unit is constructed for the transfer of the signal samples from the cyclic store to the data store in time channels of the local multiplex cycle which are not in use for the group of receive highways. The signal samples are stored in the data store in storage locations which are associated with the frequency combinations in a one-to-one relationship. The PCM words of the storage location which is associated with a frequency combination is cyclicaly applied to the output of the data store in a selected time channel of the local multiplex cycle for the transmission of the frequency combination in a time channel of a send highway. A communication path is established between this time channel and the time channel of the send highway.

BRIEF DESCRIPTION OF THE DRAWING

The invention and its advantages will be described in detail with reference to an embodiment shown in the drawing.

The single FIGURE shows a block diagram of a part of a telecommunication exchange according to the invention. In time multiplex PCM time multiplex transmission systems. In time multiplex systems of the type under consideration, the time scale is divided into frames, the length of which is a system constant. In telephony systems the frame has a length of 125 $\mu$s. It is assumed that the frames of the receive and send highways are divided into 32 time intervals, and that the frame of the telecommunication exchange is divided into 512 time intervals. The term time interval is to be understood to mean the part of the time which is used to transfer one character or PCM word. A time channel or time slot is a cyclic time interval, the cycle duration of which is equal to the frame length. Each receive and send highway thus comprises 32 time channels, a highway in the exchange comprising 512 time channels. The frame of the exchange is also divided into 32 main time intervals such that each main time interval comprises 16 time intervals. These main time intervals determine the time intervals of the send highways. The 512 time intervals of the frame of the exchange are referred to hereinafter as subtime intervals.

A character or PCM word comprises a fixed number of bits. In commonly used PCM systems each PCM word is composed of eight bits. These bits can be successively transmitted in time via one transmission path (series transmission) or can be transmitted simultaneously via a number of parallel transmission paths (parallel transmission). A character is processed by the exchange as a unit: hereinafter no reference will be made to the transmission mode of the character. In a system which is used in practice, series transmission is used on the receive and send highways, and parallel transmission is used in the exchange, said transmission methods being adapted to each other by utilizing series-parallel and parallel-series converters.

The FIGURE shows the receive highways 100–1 and 100–8 and the send highways 101–1 and 101–8. The receive highways 100–1 and 100–8 are the first and the eighth highway of a group of 8 receive highways. The 32 time channels of one receive highway constitute a group, and the 8×32 time and space divided channels of a group of eight receive highways constitute a main group. A time channel of a receive highway or receive channel has a channel number which is symbolically denoted by *K*, a group number which is symbolically denoted by *G*, and a main group number which is symbolically denoted by *V*. The complete address of a receive channel is thus symbolically denoted by *VGK*. The same applies to the send highways. The numbers of time channels of a send highway or send channels are denoted by the same symbols which, however, are provided with accents. The complete symbolic address of a send channel is *V'G'K'*.

A duplex channel for telephony comprises a time channel of a receive highway and a time channel of a send highway. A duplex channel of this kind is referred to as a telephony circuit. The two time channels of a telephony circuit can have the same numbers, i.e., *VGK* = *V'G'K'*.

A subtime interval of the frame of the exchange has a subtime interval number which is symbolically denoted by *S*, and a main time interval number which is symbolically denoted by *T*. The complete "address" of a subtime interval and that of the corresponding time channel is denoted by *ST*. Therein; *S* ranges from 1 to 16 and *T* from 1 to 32.

The receive highways 100–1 and 100–8 terminate in synchronizers 102–1 and 102–8 which convert the received characters to the time scale of the exchange, and which determine the associated channel number for each character. The output of synchronizer 102–1 comprises a character highway 103–1 and a channel number highway 104–1. The received characters appear on character highway 103–1 in main time intervals, and simultaneously with each character the associated channel number appears on channel number highway 104–1. Similarly, the output of synchronizer 102–8 comprises a character highway 103–8 and a channel number highway 104–8.

The character highways 103–1 and 103–8 and the channel number highways 104–1 and 104–8 terminate in a cyclic multiplexer 105. The output of multiplexer 105 comprises an interval character highway 106 and an internal channel number highway 107. Multiplexer 105 has a cycle of a duration of one main time interval. The operation of multiplexer 105 in each main time interval is such that in the subtime interval *S* the character which appears on the character highway of group *G*=*S* is applied to the internal character highway 106 while the assocaited channel number which appears on the channel number highway of group *G*=*S* is simultaneously applied to the internal channel number highway 107. Since *G* ranges from 1 to 8, and *S* from 1 to 16, in each main time interval eight subtime intervals are left for other purposes.

The highways 106 and 107 terminate in the input data channel and the input control channel of a random access data store 108. The data store comprises 256 character registers which are associated with the time channels of the corresponding main group in a one-to-one relationship. The 256 character registers are divided into eight groups of 32 registers. Each register has a group number which is symbolically denoted by *B* and a register number which is symbolically denoted by *R*. The complete address of a character register is symbolically denoted by *BR*. A channel number *K* which is received by the data store on the input control channel is combined with the subtime interval number *S* of the subtime interval in which the channel number is received so as to form the address *SK* = *GK*. The subtime interval number *S* is generated by a counter having a cycle of one main time interval and 16 states. The counter is controlled in subtime intervals by the clock of the exchange. This counter can be considered to form part of the data store and having a connection with the input control channel. The character which is received on the input data channel is stored by the data store in the register *BR* = *GK*. A channel register is thus associated with each time channel of the main group.

Connected to the output data channel of the data store 108 is a primary highway 109 which terminates in a matrix switch 110. This switch has a group of inputs and a group of outputs. It is to be understood that matrix switch 110 comprises as many inputs and outputs as there are main groups. This number can be, for example, 15 in practice. For the purpose of illustration only one input and only three outputs are shown. The input shown is connected to the primary highway 109. One of the outputs is illustrated as being connected to the secondary highway 111.

The transfer of the characters from the data store 108 to the primary highway 109 is controlled by a cyclic store 112 which is connected to the output control channel of the data store. This cyclic store comprises 512 storage locations, in each of which an address *GK* can be stored. The cycle duration of the store is equal to the frame length. The contents of a storage location appear cyclically on the output of the store in a subtime interval. This subtime interval unambiguously identifies the storage location. Accordingly, the address of the storage location is symbolically denoted by *ST*. The operation of the data store 108 under the control of the cyclic store 112 in each frame is such that in the subtime interval *ST* the character which is stored in the register *BR* = *GK* is applied to the primary highway 109. The storage of the address *GK* in the storage location *ST* of the cyclic store 112 thus establishes a connection between the time channel *GK* of the main group and the time channel *ST* of the primary highway 109.

The crosspoints of matrix switch 110 which are associated with the primary highway 109 are controlled by a cyclic store 113 via a decoder 114. Ignoring the word length, the cyclic store 113 is identical to store 112. The secondary highways which are connected to matrix switch 110 have the symbolic address *V'*. The operation of matrix switch 110 under the control of the cyclic store 113 in each frame is such that in the subtime interval *ST* the crosspoint between the primary highway 109 and the secondary highway whose address *V'* is received is closed. The storage of the address *V'* in the storage location *ST* of the cyclic store 113 thus establishes a connection between the primary highway 109 and the secondary highway *V'* in the time channel *ST*.

The send highways 101–1 and 101–8 originate from the send units 115–1 and 115–8, the inputs of which are connected to corresponding outputs of a controllable demultiplexer 116. The input of demultiplexer 116 is connected to the secondary highway 111. Demultiplexer 116 is controlled by a cyclic store 117. Ignoring the word length, the store 117 is identical to the cyclic stores 112 and 113. The send highways which are connected to demultiplexer 116 have the symbolic address *G'*. The operation of demultiplexer 116 under the control of the cyclic store 117 in each frame is such that in the subtime interval *ST* the character which is received from the secondary highway 111 is transferred to the send unit of the send highway whose address *G'* is received. The storage of the address *G'* in the storage location *ST* thus establishes a connection between the secondary highway 111 and the send unit of send highway $G'$ in the time channel $ST$. In its simplest form the construction of the send unit is such that a character which is received in the subtime interval $ST$ is transmitted in the main time interval $T+1$. In this case $T$ must be chosen such that $T+1=K'$, if the desired send time channel has the channel number $K'$.

The telecommunication exchange shown in the FIGURE is a typical example of an exchange in which the time and space divided channels of a main group can be selectively converted via a data store, to the time channels of an internal highway, the number of time channels of which is larger than the number of channels of the main group.

While a connection is being established, signalling signals are exchanged between the exchanges involved. If one or more of these exchanges are conventional telephone exchanges, those signalling signals may have the form of multifrequency code combinations (MFC code) which are transmitted via the telephony circuit.

For transmitting MFC codes the digital exchange under consideration is provided with a cyclic store 118 in which binary coded samples of the MFC signals are stored, and with an address generator 119 which supplies an address for each sample. In some West-European countries, MFC signalling is used in which each signal is transmitted by two signal frequencies from a group of six possible signal frequencies. The six possible signal frequencies are not the same for the forward and the return direction, so that a total of 30 different MFC code combinations exists. In the forward direction the frequencies $(1380+n.\ 120)$Hz are used, in which $n$ has the values from 0 to 5, the frequencies $(540+n.\ 120)$Hz being used in the return direction.

The cyclic store 118 stores so many samples for each MFC frequency combination that a faithful copy of the frequency combination is produced after digital-to-analog conversion. The required number of samples for one frequency combination such as the combination $(540+x.\ 120)$Hz, $(540+y.\ 120)$Hz amounts to approximately 400. The number of samples required for one MFC combination can be reduced to 100 if two special steps are taken. To this end use is made of the fact that samples bearing the numbers 201 to 400 have the same amplitude as the samples bearing the numbers 1 to 200, but the reversed polarity. Furthermore, use is made of the fact that the samples 101 to 200 have the same amplitude and polarity as the samples 1 to 100 in the reverse sequence. Use is then made of a cyclic store in the form of a shift register, the circulation direction of which can be reversed. In this store 100 samples are stored for each MFC combination. After each circulation, the direction of circulation is reversed and in each period of 4 circulations the samples are inverted during two circulations. In this way one series of 400 samples, forming the desired image of the analog MFC combination, is produced from four identical series of 100 samples. In one frame of 125 $\mu$s one sample is transmitted, so that one cycle of the cyclic store 118 will amount to $100.125\ \mu s = 12.5$ ms. In view of the accommodation of the MFC samples in the time scale of the exchange, the number of storage locations of the cyclic store 118 is preferably chosen to be a multiple of 32, i.e., equal to $100.32 = 3{,}200$. The contents of a storage location then fit exactly in one main time interval. The first 30 storage locations of a group of 32 storage locations are used for storing one sample of each MFC frequency combination. The address generator 119, which has a cycle of one frame and which may be a simple counter, indicates the number $N$ of the MFC frequency combination for each sample.

The output of the cyclic store 118 is formed by the character highway 120, and the output of address generator 121 is formed by the number highway 121. These highways are connected, analogous to to the corresponding highways of the receive highways 100–1 and 100–8, to a (ninth) input of multiplexer 105. This multiplexer associates the subtime interval $S(9)$ with the highways 120 and 121 in the manner in which the subtime intervals $S(1{:}8)$ are associated with the receive highways.

The data store 108 comprises a ninth group of 32 character registers having the symbolic addresses $B(9)R$. The operation of the data store 108 with respect to the MFC samples is such that a sample having the number $N$ which is received from highway 106 in the subtime interval $S(9)$ is stored in the character register $B(9)R=S(9)N$. A character register $B(9)R$ is thus associated with each MFC combination. If a plurality of main groups are present, the highways 120 and 121 are multiple connected to the multiplexers of the other multiple groups, the multiplexers and data stores of which are constructed in the same manner as those of the main group shown.

The MFC signalling is effected under the control of a central control unit or processor which is not shown in the FIGURE. This processor has access to the cyclic stores 112, 113 and 117. It is assumed that MFC signals are to be transmitted via the send channel $V'G'K'$. The processor first selects a free time channel ST which gives access to the desired send channel. In the exchange under consideration this will be a time channel which will be subject to $T+1=K'$. The address $S$ can still be chosen at random, and 16 possibilities exist in this respect. It is assumed that the send channel forms part of the main group shown. The processor then accesses the cyclic stores 112, 113 and 117 and determines an address $ST$ on which no address information is stored in any of the cyclic stores. Subsequently, the processor transfers the address $G'$ to storage location $ST$ of store 117 and the address $V'$ to storage location $ST$ of store 113. The address $S(9)N$ of the first MFC combination to be transmitted is transferred to storage location $ST$ of the store 112. The data store 108 then transmits the samples of MFC combination $S(9)N$ in the time channel $ST$ and the samples are applied to the send channel $V'G'K'$ via the primary highway 109, the secondary highway 111 and the demultiplexer 116. In a manner not shown, the processor receives an MFC combination back via the receive channel $VGK$ which is associated with the send channel $V'G'K'$. According to the forced MFC signalling mode, the transmission of the current MFC combination is terminated after reception of an MFC combination. This can be effected in this case by erasing the address in the storage location $ST$ of the cyclic store 112. If a second MFC combination is to be transmitted according to the MFC signalling mode, the processor accesses the cyclic store 112 and transfers the address of the second MFC combination to the storage location $ST$. The MFC signalling mode is thus performed by changing the address which is stored in the storage location $ST$ of the cyclic store 112.

It is advantageous to use the data store of the multiple group of the incoming telephone circuit for the MFC signalling in the forward direction, i.e., in the direction in which the telephone connection is established. In the cyclic store 112 of the incoming telephone circuit it is then possible (after termination of the MFC signalling) to store the address *GK* of the receive channel of the incoming telephone circuit in the storage location *ST* used for the MFC signalling, so as to connect the incoming telephone circuit to the send channel of the outgoing telephone circuit. In this case it is thus not necessary to search a free time channel for this connection.

The samples of the MFC signals which are stored in the cyclic store 118 can be calculated in advance by means of a computer program and can be recorded on a magnetic tape in the form of eight bit characters. The MFC samples are subsequently fed into the cyclic store 118 from this magnetic tape.

It is to be noted that by using a cyclic store for the MFC not only the otherwise required frequency sources are saved, but that in this way MFC frequency combinations can be realized which have the same high degree of stability as the clock of the digital exchange, while at the same time the tolerance of the amplitude is zero.

What is claimed is:

1. A telecommunication system with time division multiplex for interconnecting a receive highway and a send highway of a PCM time multiplex transmission system, said highways having a multiplex cycle which comprises a group of time channels, the telecommunications system comprising a data store which is associated with a group of receive highways; a multiplex transfer means for the transfer, in time channels of a local multiplex cycle, of the received PCM words from the group of receive highways to the data store in which these PCM words are stored in storage locations which are associated with the time channels of the group of receive highways in a one-to-one relationship, said local multiplex cycle comprising a number of time channels which is larger than the number of time channels of the group of receive highways together; a cyclic store means for controlling the cyclic transfer of the PCM words from a selected storage location of the data store to the output of the data store in a selected time channel of the local multiplex cycle; a selective time multiplex switching network means for selectively connecting the time channels of the output of the data store with the channels of the send highways; a cyclic store means for storing a group of signal samples of frequency combinations in the form of PCM words in storage locations which are accessible at intervals of a multiplex cycle, one signal sample of each other frequency combination being stored between each two successive signal samples of one frequency combination; the multiplex transfer unit means further comprising means for transferring the signal samples from the cyclic store to the data store in time channels of the local multiplex cycle which are not in use for the group receive highways, the signal samples being stored in said data store in storage locations which are associated with the frequency combinations in a one-to-one relationship, the data store further comprising means for cyclically applying the PCM words of the storage location which is associated with a frequency combination to the output of the data store in a selected time channel of the local multiplex cycle for the transmission of the frequency combination in a time channel of a send highway, a communication path thereby being established between this time channel and the channel of the send highway.

* * * * *

UNITED STATES PATENT OFFICE

CERTIFICATE OF CORRECTION

Patent No. 3,801,746 Dated April 2, 1974

Inventor(s) ROBERT BERTOLD BUCHNER

It is certified that error appears in the above-identified patent and that said Letters Patent are hereby corrected as shown below:

IN THE SPECIFICATION

Col. 2, line 19, cancel "In time multiplex PCM time multiplex trans-";

line 20, cancel "mission systems";

Col. 6, line 8, cancel "to" second occurence.

Signed and sealed this 10th day of September 1974.

(SEAL)
Attest:

McCOY M. GIBSON, JR.
Attesting Officer

C. MARSHALL DANN
Commissioner of Patents